(12) United States Patent
Tohyama et al.

(10) Patent No.: US 7,403,279 B2
(45) Date of Patent: Jul. 22, 2008

(54) INFORMATION RECORDING MEDIUM EXAMINING APPARATUS AND METHOD

(75) Inventors: Keiichi Tohyama, Yokohama (JP); Nobuharu Noji, Zushi (JP); Shoji Yoshikawa, Hachioji (JP)

(73) Assignee: Ebara Corporation, Tokyo (JP)

( * ) Notice: Subject to any disclaimer, the term of this patent is extended or adjusted under 35 U.S.C. 154(b) by 336 days.

(21) Appl. No.: 11/248,612

(22) Filed: Oct. 13, 2005

(65) Prior Publication Data

US 2006/0087953 A1    Apr. 27, 2006

(30) Foreign Application Priority Data

Oct. 14, 2004    (JP) .............................. 2004-299952

(51) Int. Cl.
*G01N 21/00* (2006.01)
(52) U.S. Cl. ................................. 356/237.2; 356/237.3
(58) Field of Classification Search ........................ None
See application file for complete search history.

(56) References Cited

U.S. PATENT DOCUMENTS 5,389,794 A * 2/1995 Allen et al. ............ 250/559.48

6,936,816 B2 * 8/2005 Mankos et al. .............. 250/307

FOREIGN PATENT DOCUMENTS

| JP | 9-54952 | 2/1997 |
| JP | 2004-55119 | 2/2004 |

* cited by examiner

*Primary Examiner*—Michael P Stafira
(74) *Attorney, Agent, or Firm*—Westerman, Hattori, Daniels & Adrian, LLP.

(57) ABSTRACT

In an examining apparatus, an electron gun irradiates an intended position of an information recording medium with an electron beam. A stage holds the information recording medium such that the information recording medium can be moved along a rotation direction and a radial direction. A detector detects electrons which have acquired information of a surface of the information recording medium by irradiating the information recording medium with the electron beam. An image producing unit acquires an image of the surface of the information recording medium based on the electrons detected by the detector. The examining apparatus can examine as to whether or not a defect of an information recording medium such as a CD and a DVD is present, but also can examine a shape of the defect thereof. The examining apparatus can also examine an information recording medium having a large storage capacity.

10 Claims, 9 Drawing Sheets

INFORMATION RECORDING MEDIUM EXAMINING APPARATUS AND METHOD

BACKGROUND OF THE INVENTION

1. Field of the Invention

The present invention is related to an apparatus and a method for examining appearances of information recording media. Information recording media typically are disks such as optical disks.

2. Background

In optical disks such as CDs (compact Disks) and DVDs (Digital Versatile Disks), small-sized concaves called "pits" are formed in surfaces of these optical disks, and these pits own information. These pits are optically read by optical pick-up heads, so that sound and pictures may be reproduced. Since optical disks are manufactured by employing a mother disk of these optical disks, structural objects which correspond to the pits are also present on this optical-disk mother disk.

When optical-disk mother disks and optical disks manufactured after injection molding are examined, examining apparatus irradiates the optical disks with light such as laser light, actually read signals of reflection light, and measure completion characteristics of recording operations, signal strengths, noise, and the like based upon the actually read signals in order to examine as to whether or not an error pit is present on the examined optical disks. Conventional examining apparatus are disclosed in, for example, Japanese Laid-open Patent Application No. Hei-9-54952 (refer to pages 3 and 4, FIG. 1), and Japanese Laid-open Patent Application No. 2004-55119 (refer to page 5, FIG. 1).

The conventional information recording medium examining apparatus merely read out optical signals from optical-disk mother disks and optical disks. Therefore, these conventional examining apparatus cannot examine that error pits have what shapes. However, since there is a close relationship between shapes of pits and recording operations, it is desired to provide technical ideas capable of further examining shapes of pits of optical disks.

Also, while disks having large storage capacities are developed, for example, as to an optical disk having a storage capacity of 100 GB (gigabytes), dimensions of concaves/convexs of pits are reached to several 10 nm. Dimensions of these pits are required to be manufactured in precision of 1 nm levels. Therefore, when shapes of optical-disk mother disks and shapes of manufactured optical disks are tried to be examined, examination capabilities in 1 nm precision levels are necessarily required.

SUMMARY OF THE INVENTION

The present invention is made under the above-described technical background. An object of the present invention is to provide an examining apparatus and an examining method, capable of not only examining as to whether or not a defect is present in an information recording medium, but also capable of examining a surface structure such as pit shapes and the like of the information recording medium, and further capable of examining an information recording medium having a large storage capacity.

An aspect of the present invention is an information recording medium examining apparatus which examines an appearance of an information recording medium. This information recording medium examining apparatus is comprised of: an electron gun for irradiating an intended position of said information recording medium with an electron beam; a stage for holding the information recording medium such that the information recording medium can be moved along a rotation direction and a radial direction; a detector for detecting electrons having acquired information of a surface of the information recording medium by irradiating the information recording medium with the electron beam; and an image producing unit for acquiring an image of the surface of the information recording medium based on the electrons detected by the detector.

Another aspect of the present invention is an information recording medium examining apparatus for examining an information recording medium. This information recording medium examining apparatus is comprised of: an information recording medium defect detecting unit including: a light source for irradiating the information recording medium; a stage for rotating the information recording medium with light; a light receiving device for receiving reflection light from the information recording medium; and a calculating apparatus for judging whether or not a defect of a pit on the information recording medium is present by comparing information of the received reflection light with design data, and for producing defect positional data of the pit; and an information recording medium defect observing unit including: an electron gun for irradiating a region which contains the defect position indicated by the defect positional data with an electron beam; a detector for detecting electrons generated from the region of the information recording medium which is irradiated with the electron beam; and an image producing unit for producing an image of a surface of the information recording medium based on the electrons detected by the detector.

Another aspect of the present invention is an information recording medium recording and examining apparatus for irradiating a surface of an information recording medium with an electron beam so as to record thereon information and for examining an abnormal condition of the recorded information. This information recording medium recording and examining apparatus is comprised of: a first electron gun for irradiating the information recording medium with an electron beam so as to record thereon information; a stage for mounting thereon the information recording medium such that the information recording medium can be moved along a rotation direction and a radial direction; a second electron gun for irradiating the information recording medium with an electron beam in order to read the information recorded on the information recording medium; a detector for detecting electrons emitted from the information recording medium; and a defect calculating operation unit for reading the information recorded on the information recording medium from the electrons detected by the detector and judging as to whether or not an abnormal condition of the information recording medium is present.

A further aspect of the present invention is an information recording medium examining method for examining an appearance of an information recording medium. This examining method comprises irradiating an intended position of the information recording medium with an electron beam; detecting electrons having acquired information of a surface of the information recording medium by irradiating the information recording medium with the electron beam; and acquiring an image of the surface of the information recording medium from the detected electrons.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain some principles of the invention.

DETAILED DESCRIPTION

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

The present information recording medium examining apparatus examines an appearance of an information recording medium. This examining apparatus is comprised of: an electron gun for irradiating an intended position of the information recording medium with an electron beam; a stage for holding the information recording medium such that the information recording medium can be moved along a rotation direction and a radial direction; a detector for detecting an electrons which have acquired information of a surface of the information recording medium by irradiating the information recording medium with the electron beam; and an image producing unit for acquiring an image of the surface of the information recording medium based on the electrons detected by the detector.

According to the configuration, the examining apparatus emits the electron beam onto the information recording medium and irradiates the information recording medium with the electron beam, detects the electrons which have acquired the information of the surface of the information recording medium, and acquires the image of the surface of the information recording medium. Therefore, the surface structure of the information recording medium can be examined by this examining apparatus. Also, since the electron beam is employed, the very fine shape can be examined, and thereby this examining apparatus can examine the information recording medium having the recording-purpose structural objects which are made in very fine shapes in order to achieve the high storage capacity.

The information recording medium examining apparatus may be furthermore equipped with a comparing unit for comparing the images with each other. Since the images are compared with each other, a defect may be detected.

Also, the information recording medium examining apparatus may be furthermore equipped with a judging/calculating unit for judging as to whether or not a value related to a shape of a pit formed on the information recording medium is present within a predetermined range and for judging as to whether or not an abnormal condition is present. Therefore, it is possible to mechanically judge whether or not the abnormal condition is present.

The detector may own a plurality of pixel arrays on the detecting surface thereof, and an image of a surface of the information recording medium may be projected onto this detecting surface. Therefore, the information of the projection image of the information according medium may be suitably obtained.

Also, the detector may have a two-dimension pixel array on the detecting surface and the detector may own a function capable of integrating signals of images of the surfaces of the information recording medium, which are projected on the detecting surface while the stage moves, wherein signals of lines of said two-dimensional pixel array are integrated as units of integrating (line signals are integrated). Accordingly, the suitable examination data having a large S/N ratio can be acquired.

The electron gun may emit an electron beam having an area capable of irradiating a region which contains a region on a sample corresponding to the imaging region of the detector. Therefore, the image projection is carried out, so that a suitable image of the surface of the information recording medium may be obtained.

The information recording medium examining apparatus may be provided with a defect detecting unit for acquiring a defect of a pit on the information recording medium from reflection light produced when light is emitted onto the information recording medium so as to produce defect positional data which indicates the position of the defect. The electronic gun may irradiate the defect position indicated by the defect positional data produced by the defect detecting unit with an electron beam. Therefore, the defect may be quickly found out by employing the light at the defect detecting unit. Then, the image of the found defect may be acquired in high precision by irradiation of the electron beam. Therefore, the shape observation of the defect may be quickly carried out in the high precision.

The information recording medium examining apparatus may be provided with a recording-purpose electron gun for irradiating the information recording medium with an electron beam in order to record thereon information. An irradiation position of the examining-purpose electron beam may be provided at a post or afterward position of an irradiation position of the recording-purpose electron beam by the recording-purpose electron gun. Therefore, the information may be recorded on the image recording medium mounted on the stage by employing the recording-purpose electron gun, and also, the information recording medium may be examined by irradiation of the electron beam by employing the examining-purpose electron gun. Therefore, the information recording medium examining apparatus can examine as to whether or not the defect is present just after the recording operation, so that the productivity can be improved.

The information recording medium examining apparatus, according to another aspect, is provided with an information recording medium defect detecting unit and an information recording medium defect observing unit. The information recording medium defect detecting unit includes: a light source for irradiating the information recording medium; a stage for rotating the information recording medium with light; a light receiving device for receiving reflection light from the information recording medium; and a calculating apparatus for judging whether or not a defect of a pit on the information recording medium is present by comparing information of the received reflection light with design data, and for producing defect positional data of the pit. The information recording medium defect observing unit includes: an electron gun for irradiating a region which contains the defect position indicated by the defect positional data with an electron beam; a detector for detecting electrons generated from the region of the information recording medium which is irradiated with the electron beam; and an image producing unit for producing an image of a surface of the information recording medium based on the electrons detected by the detector. An irradiating position control unit may suitably be provided in order to irradiate the defect position with the electron beam. The irradiating position control unit may be an alignment control unit for performing a positional alignment of the information recording medium based upon the defect positional data produced by the information recording medium defect detecting unit. Also, the irradiating position control unit may be a deflection control unit for changing a direction of an electron beam. In this aspect, the defect may be quickly found out by employing the light in the defect detecting unit. Then, the image of the found defect may be acquired in high precision by irradiation of the electron beam. Therefore, the shape observation of the defect can be quickly carried out in the high precision.

Another aspect is to provide an information recording medium recording and examining apparatus for irradiating a surface of an information recording medium with an electron beam so as to record thereon information and for examining an abnormal condition of the recorded information. This apparatus is comprised of: a first electron gun for irradiating the information recording medium with an electron beam so as to record thereon information; a stage for mounting thereon the information recording medium such that the information recording medium can be moved along a rotation direction and a radial direction; a second electron gun for irradiating the information recording medium with an electron beam in order to read the information recorded on the information recording medium; a detector for detecting an electrons emitted from the information recording medium; and a defect calculating operation unit for reading the information recorded on the information recording medium from the electrons detected by the detector and judging as to whether or not an abnormal condition of the information recording medium is present. In this aspect, the information is recorded on the information recording medium mounted on the stage by employing the first electronic gun, and the information recording medium is examined by irradiation of the electron beam by employing the second electron gun. This information recording medium recording and examining apparatus can examine as to whether or not the defect is present after the information is recorded, and can quickly perform the examination. Therefore, the productivity can be improved.

A further aspect is to provide an information recording medium examining method for examining an appearance of an information recording medium. This examining method comprises irradiating an intended position of the information recording medium with an electron beam; detecting electrons which have acquired information of a surface of the information recording medium by irradiating the information recording medium with the electron beam; and acquiring an image of the surface of the information recording medium from the detected electrons. According to this aspect, the above-described advantages of the present invention may be achieved.

As previously explained, in accordance with the present invention, the surface structures such as shapes of pits can be observed and examined as the subjects, and also, the very fine recording structures of the information recording medium having the large storage capacity can be properly observed and examined.

Furthermore, since the image projection type electron beam examination is carried out, the time durations required for the observing and examining operations can be considerably reduced. The examining apparatus and the examining steps can be assembled in the production line of the information recording medium.

First Embodiment

Referring now to drawings, an embodiment of the present invention will be described in detail. In the present embodiment, the information recording medium examining apparatus is a disk examining apparatus, and the information recording medium is an optical disk. It should be noted that the present invention is not limited only to this embodiment.

Figure 1:
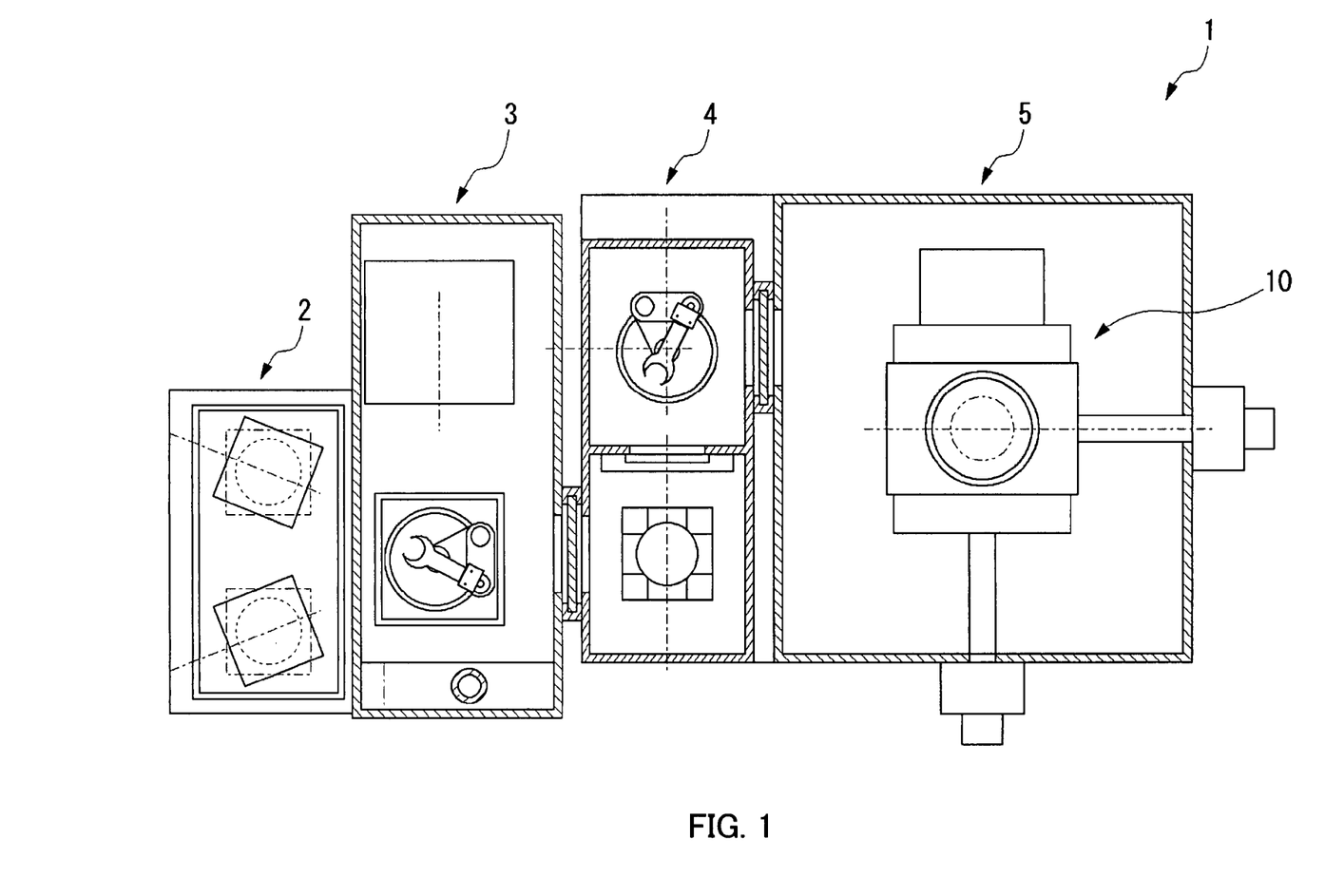
FIG. 1 is a diagram for schematically showing an entire structure of an information recording medium examining apparatus according to the first embodiment of the present invention.

FIG. 1 is a plan view for showing an entire structure of a disk examining apparatus 1 according to the first embodiment. The disk examining apparatus 1 is constituted by a cassette holder 2, a mini environment apparatus 3, a load lock chamber 4, and an examining room 5.

The cassette holder 2 holds a cassette on which disks are mounted. A disk is taken out from the cassette by a transfer robot (not shown), and then, is transferred to a mini environment room of the mini environment apparatus 3.

Figure 2:
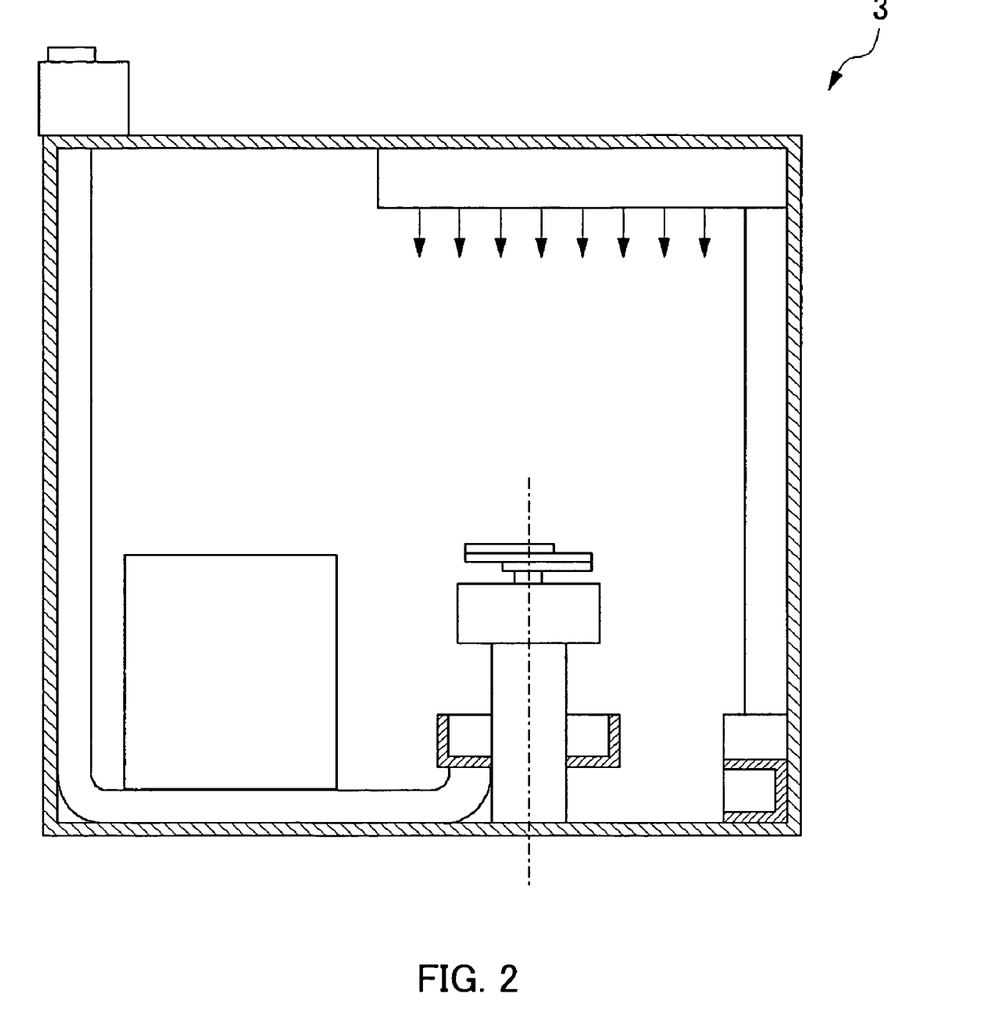
FIG. 2 is a diagram for schematically indicating a partial structure of the examining apparatus indicated in FIG. 1.

The mini environment apparatus 3 plays a role of maintaining a disk within clean air. In the mini environment apparatus 3, air is supplied which is cleansed by employing HEPA or ULPA. As indicated in FIG. 2, the mini environment apparatus 3 is arranged so as to cause air to down-flow. Otherwise, the mini environment apparatus 3 is arranged such that air is circulated within the mini environment room. Further, the mini environment apparatus 3 may be arranged so as to supply clean gas such as inert gas. A disk which should be examined is transferred by the transfer robot from the mini environment room to the load lock chamber 4, and then, is mounted on a mounting base employed in the load lock chamber 4.

The load lock chamber 4 is provided so as to keep pressure of the examining room 5 in a proper pressure value. An inner space of the examining room 5 is high vacuum, whereas the examining apparatus outside the examining room 5 is in atmospheric pressure. It is not desirable that atmosphere is penetrated into the examining chamber 5 immediately after a door of the examining room 5 is opened. To avoid this, the load lock chamber 4 is provided as a room capable of playing a role of cushion function. The optical disk which should be examined is once transferred to the load lock chamber 4, and then, a door of a load lock room is closed. Thereafter, a door provided between the examining room 5 and the load lock room is opened, and then, the optical disk is transferred to the examining room 5. Since the above-explained constructions and operations are conducted, it is possible to avoid that pressure of the inner space of the examining room 5 is rapidly increased when a disk which should be examined is transferred into the examining room 5.

As will be explained hereinafter, the examining room 5 is equipped with an examining apparatus 10 according to this embodiment, which utilizes electron beams. Then, in the above-explained arrangement, the optical disk which is the object to be examined is sequentially transferred from the cassette holder 2 via the mini environment apparatus 3 and the load lock chamber 4 to the examining room 5, and thus, is examined in the examining room 5.

Figure 3:
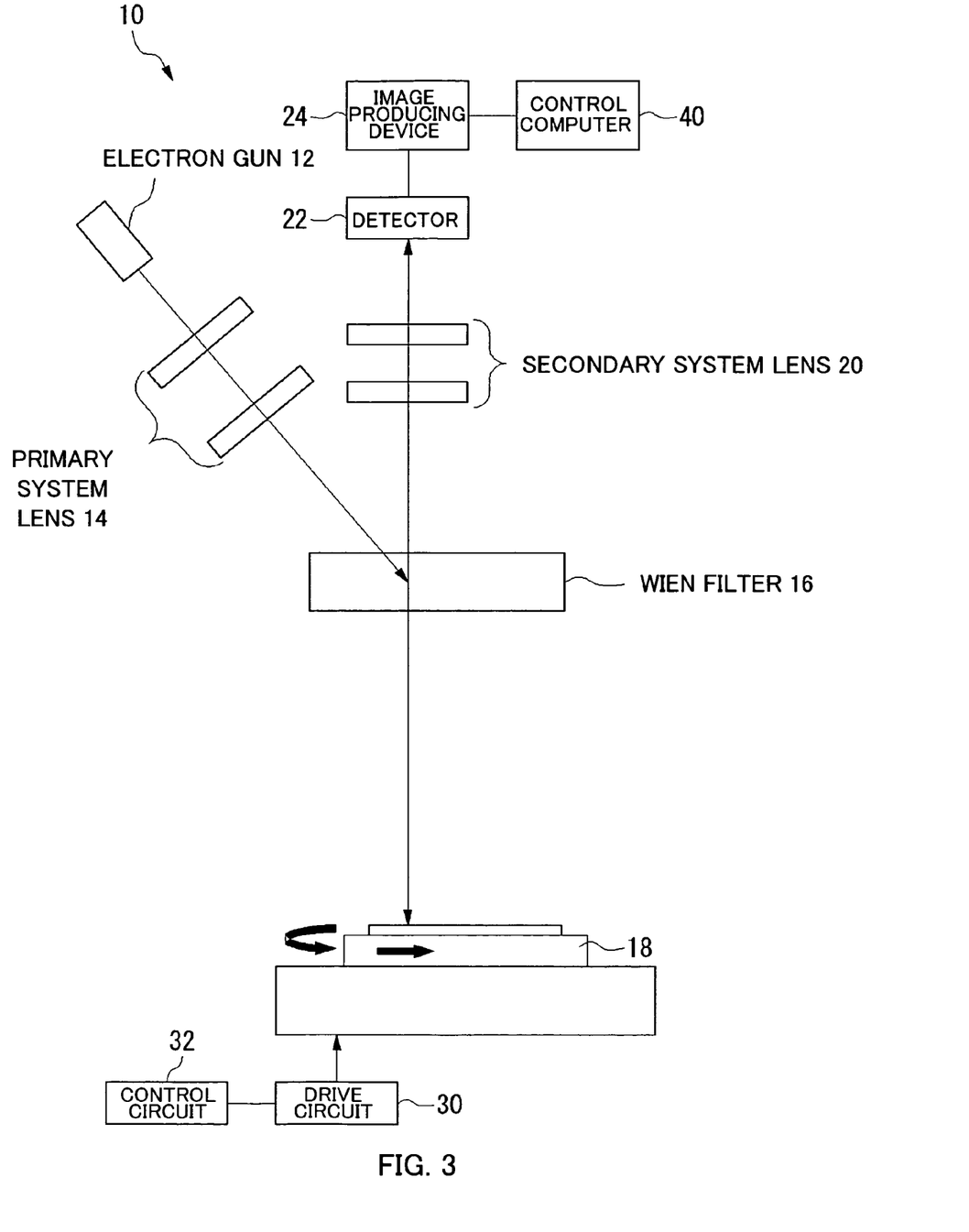
FIG. 3 is a diagram for illustratively representing an arrangement of the examining apparatus according to the first embodiment of the present invention.

FIG. 3 illustratively shows an arrangement of the examining apparatus 10 provided in the examining room 5 of FIG. 1. The examining apparatus 10 is equipped with an electron gun 12, the primary system lens 14, a Wien filter 16, a stage 18, the secondary system lens 20, a detector 22, and an image producing device 24.

Next, these structures and functions are explained. The electron gun 12 emits electrons along a predetermined direction. The electron gun 12 may be a field emission type electron gun, or a thermionic emission type electron gun. An electron beam to be emitted may be a narrowed electron beam whose diameter is narrowed to become a single pixel so as to be used in an SEM (scanning electron microscope). Also, the electron gun 12 may produce an electron beam having a certain area so as to be used in an image projection type structure. As to the latter-mentioned electron beam, a plurality of pixels are contained in a beam diameter thereof, and this electron beam owns a size which corresponds to the plurality of pixels.

The primary system lens 14 is a lens used to focus the electron beam. The focusing of the electron beam is carried out by changing and adjusting a setting condition of a voltage which is being applied to the primary system lens 14.

The Wien filter 16 generates an electric field and a magnetic field in a vertical direction within a plane to apply Lorentz force to the electron beam, and thus, deflect an entered primary electron beam and a reflected secondary electron beam at different deflection angles, so that the primary electron beam and the secondary electron beam are separated from each other by the Wien filter 16. A usual Wien filter is set so as to cause the primary electron beam to penetrate along a straight line and bend an orbit of the secondary electron beam. Otherwise, the usual Wien filter is set so as to bend an orbit of the primary electron beam, which is emitted toward a target along an oblique direction, to be directed to a sample, and cause the reflected secondary electron beam to pass along a straight line. In the example of FIG. 3, the latter-mentioned structure is employed. Therefore, the Wien filter 16 is arranged so as to cause the primary electron beam to be deflected, and cause the secondary electron beam to penetrate along the straight line.

Figure 4:
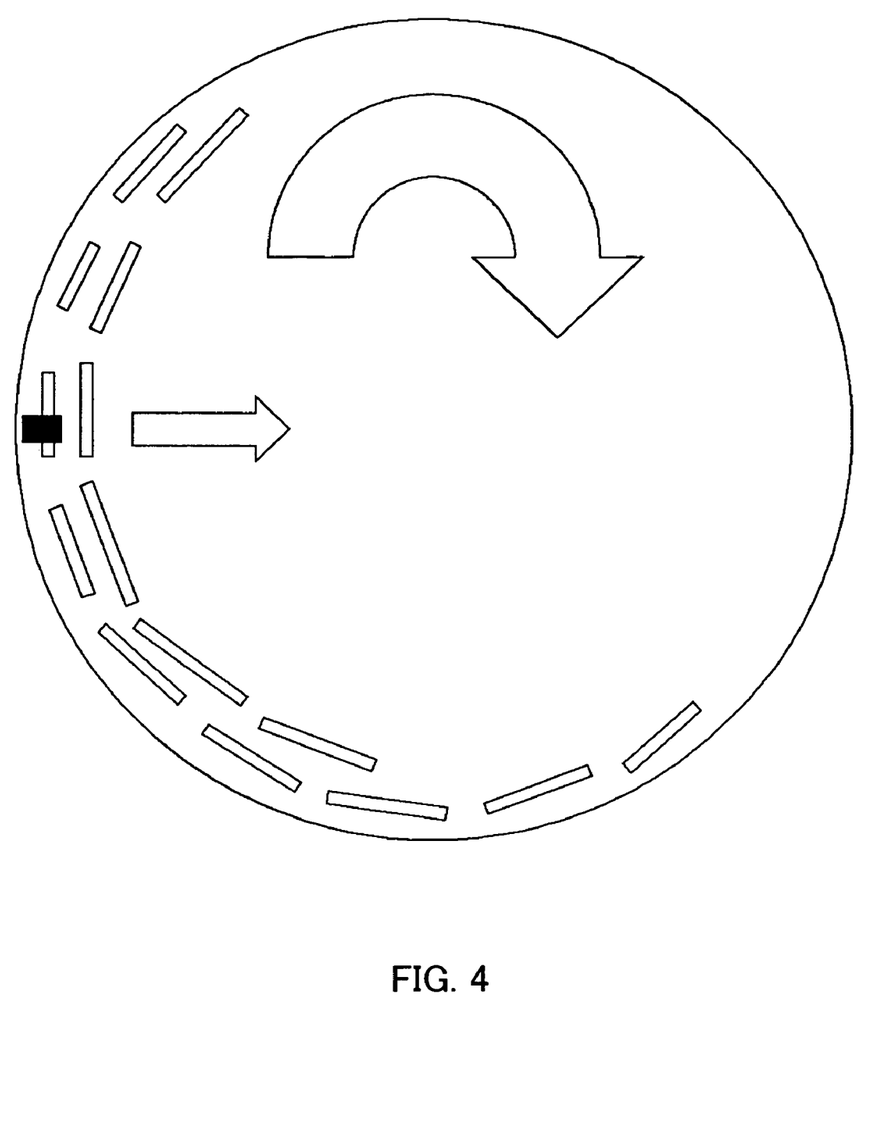
FIG. 4 is a plan view for illustratively showing an information recording medium.

The stage 18 is equipped with a mounting base which mounts thereon an optical disk as the sample, and is arranged so as to be able to move the optical disk along a rotation direction and a radial direction. As schematically shown in FIG. 4, information of the optical disk is sequentially arranged along the rotation direction. Accordingly, the examining apparatus 10 of this embodiment moves the stage 18 along the data on the optical disk, that is, along the rotation direction of the optical disk. While the stage 18 is moved, an electron beam is emitted onto the optical disk and the optical disk is irradiated with an electron beam, and images are acquired. At this time, the stage 18 is rotated while a center of the optical disk is set as an axis. Also, the stage 18 is moved along the radial direction of the optical disk. Thereby different positions along the radial direction can be examined.

A drive circuit 30 and a control circuit 32 are provided for driving the stage 18. The drive circuit 30 drives an actuator provided on the stage 18 so as to rotate the stage 18 on which the optical disk is mounted, and also, move the stage 18 along the radial direction of the optical disk. The control circuit 32 transmits a control signal to the drive circuit 30 in order to control operations of the stage 18, so that this control circuit 32 controls a rotation number, a position, and other parameters of an optical disk. The control circuit 32 with the drive circuit 30 functions as an alignment control device which locates the state 18 and the optical disk to predetermined positions.

The detector 22 detects electrons which are emitted from the optical disk by irradiating it with the electron beam. In the case that the primary electron beam is narrowed like a beam employed in an SEM (scanning electron microscope), the detector 22 is constituted by a diode detector, or the like, and outputs an electric signal according or corresponding to an amount of detected electrons.

Figure 5:
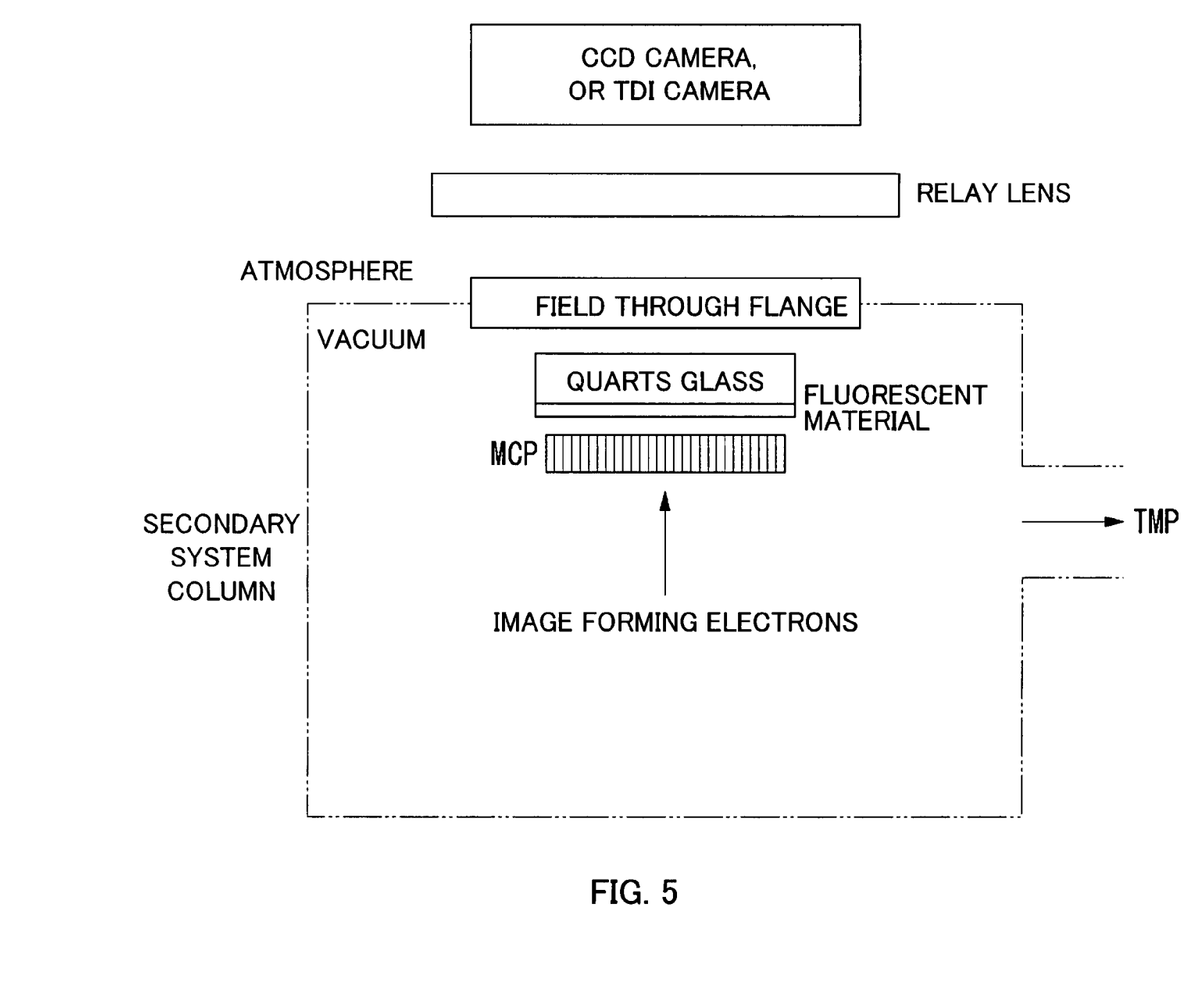
FIG. 5 is a diagram for illustratively showing a structural example of a detector employed in the examining apparatus of FIG. 1.
Figure 6:
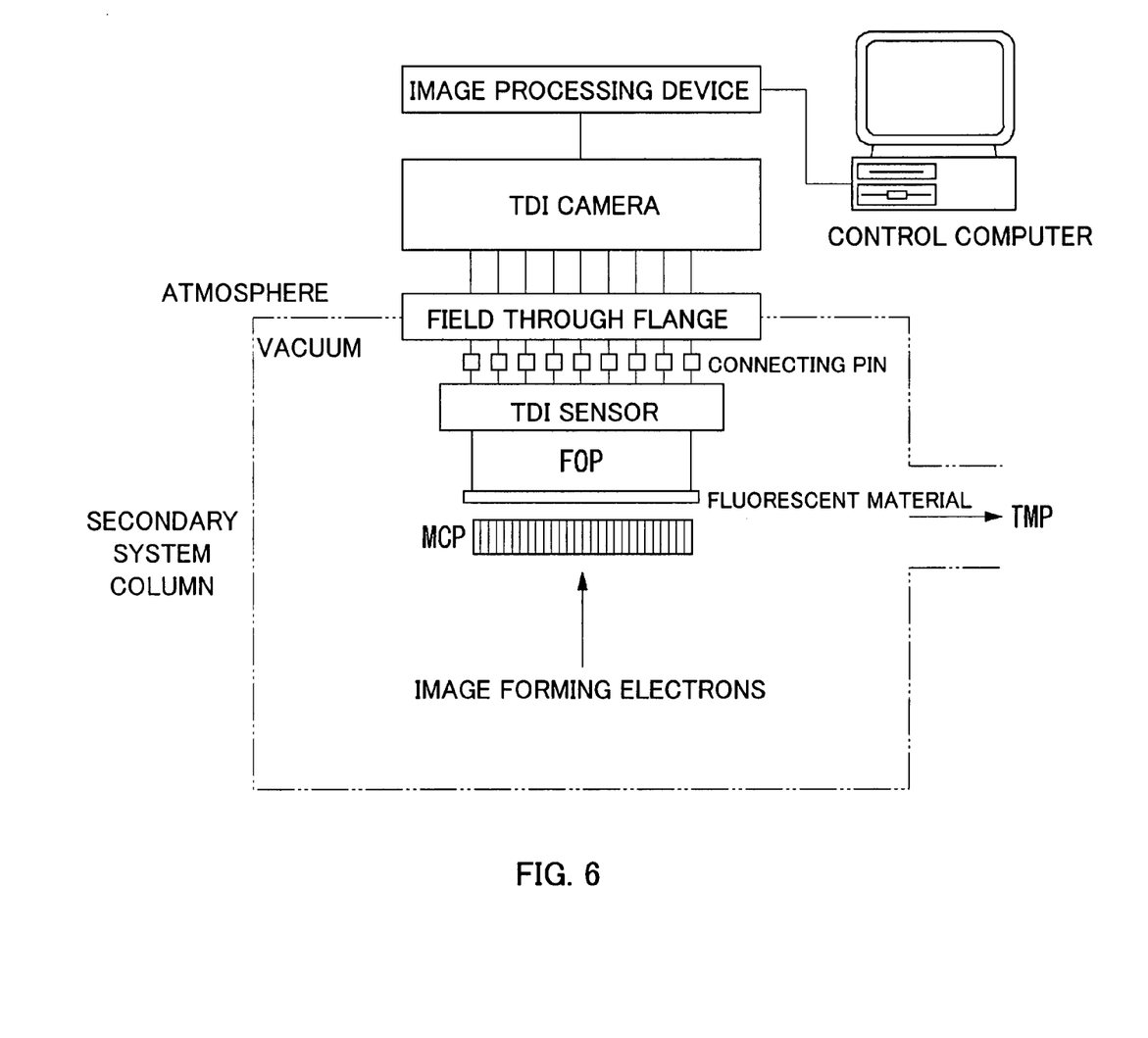
FIG. 6 is a diagram for illustratively indicating another structural example of a detector employed in the examining apparatus of FIG. 1.
Figure 7:
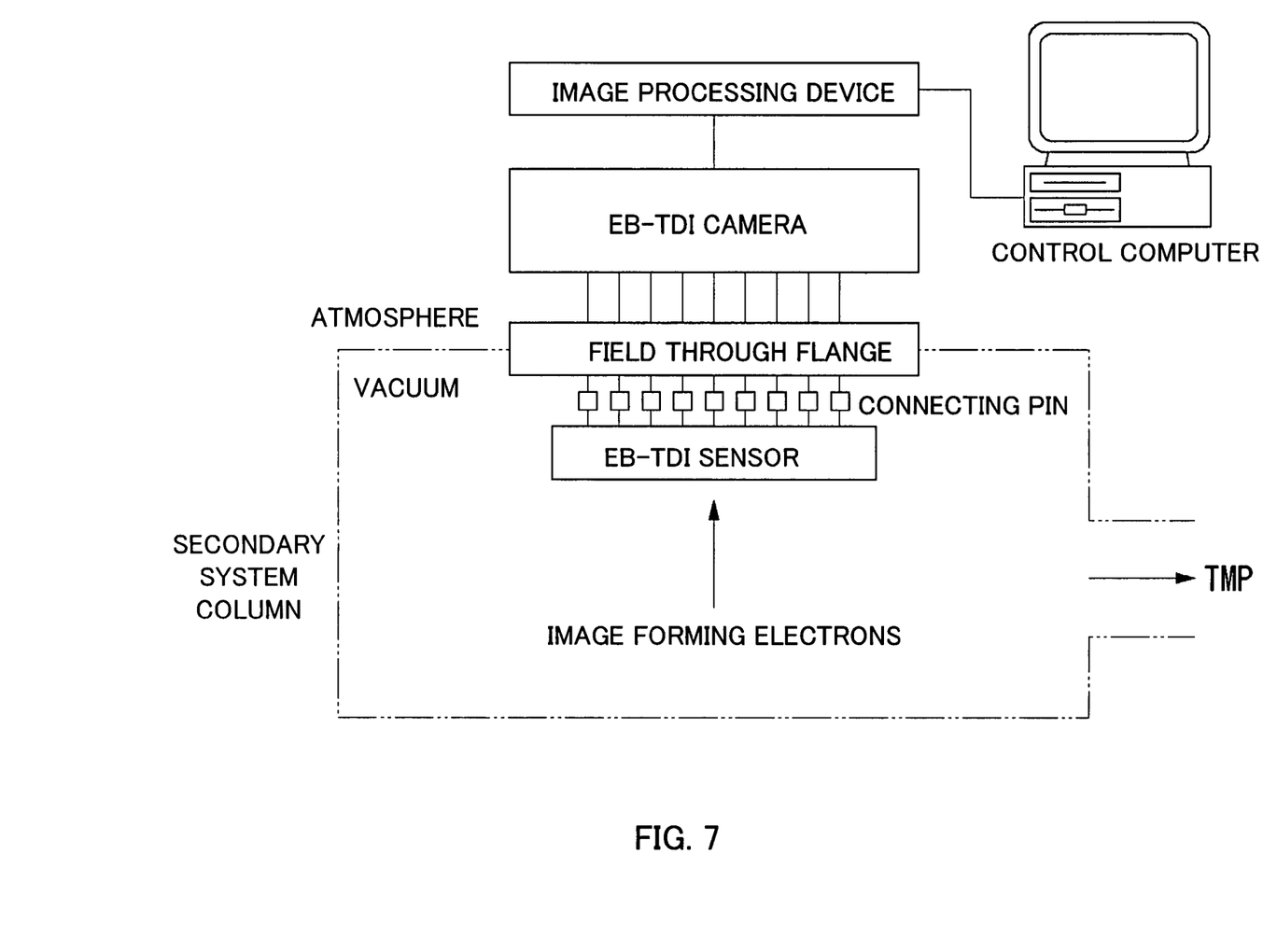
FIG. 7 is a diagram for illustratively representing another structural example of a detector employed in the examining apparatus of FIG. 1.

On the other hand, in such a case that an area beam having a certain area is employed as the primary beam, as indicated in FIG. 5 and FIG. 6, an imaging element such as either a CCD or a TDI-CCD is suitably employed as the detector 22. In this case, a path of an electron beam is adjusted by either a lens 20 or a deflector of the secondary optical system, and a focusing operation is carried out such that an image of the disk surface is focused on this detector 22. Two different types of detectors are known as the detector 22 using the imaging element. In one type of detector, light is received on a light detecting surface, and then, the received light is converted into an electric signal (this type of detector is conventional well known). In another type of detector, electrons are directly received by a detecting surface, and then, an electric signal is outputted according or corresponding to the received electrons (this type of detector is known as so-called "EB-CCD", or "EB-TDI-CCD" etc). FIG. 7 indicates a structural example of an EB-TDI type detector. In this embodiment, either type of detectors may be applied. In the case that the detector receives light by a light receiving surface (either CCD or TDI-CCD etc.), electrons emitted from an optical disk is amplified by an MCP, and further, the electrons are converted into light by a scintillator. An optical signal thus converted into the light is focused onto the detecting surface of the detector with employment of the imaging element.

A TDI (Time Delay Integration) is an integration type line sensor and has a two-dimensional pixel array on a detecting surface. When a sample (medium) is relatively moved with respect to the line sensor, a projection image of the sample also moves on the detecting surface. The TDI sensor owns a function integrating image signals in the line unit of the two-dimensional pixel array, that is, signals of lines of said two-dimensional pixel array are integrated as units of integrating (line signals are integrated) by TDI. Wherein, images of the respective lines of the sample (medium) are integrated. More specifically speaking, when an image corresponding to 1 line on the sample moves over the detecting surface, the TDI sensor sequentially acquires signals of adjoining pixel lines and integrates the acquired line signals in conjunction with the movement of the image. Thereby, while an image of the same portion (line-shaped portion) pass through or intersects the detecting surface, images of this line-shaped portion are captured, and then, signals of images of this same line-shaped portion are continuously obtained and integrated. Thus, the images of the sample are integrated.

An electric signal outputted from the detector 22 is supplied to the image producing device 24. This technical point is similar to a case that the above-explained scanning type detection is carried out, and also in the case that an image projection type detection is carried out. The electric signal derived from the detector 22 is a signal indicative of the detection result, and owns information indicative of an image of the surface of the optical disk. The image producing device 24 is equipped with a display. The image producing device 24 produces the image of the surface of the optical disk from the signal detected from the detector 22, and then, displays the produced image on this display. Also, the image producing device 24 supplies the data as to the image of the surface of the optical disk to a control computer 40.

The control computer 40 is a computer for controlling the examining apparatus 10, and executes a process operation for processing image information of the optical disk and judging as to whether or not an abnormal condition is present. The process operation for judging as to whether or not the abnormal condition is present is carried out by executing a judging-purpose program by this control computer 40. Also, a circuit capable of realizing the judging process operation may be provided. The control computer 40 may be arranged with the control circuit 32 in an integral manner.

As previously explained, in this embodiment, since the optical disk is rotated by the stage 18 during the disk examination, images are acquired in either a concentric circular shape or a spiral shape along the signal direction (namely, rotation direction) on the optical disk. If the image signals are changed in an abnormal condition, then the control computer 40 can grasp that the image data strings are changed in an abnormal condition, and therefore, can quickly find out an abnormal condition of the optical disk. Generally speaking, as to this point, since information on an optical disk represents, for example, voice and/or images, widths of changes in signals must be within a predetermined range. Therefore, a threshold value of a changing width of a specific parameter is previously provided. When a changing width which exceeds this threshold value is detected, the control computer 40 can judge that an abnormal condition is present on an optical disk. As this threshold value, a proper range may be determined in accordance with a nature of a data source. Also, a subject of a parameter is, for example, a dimension of a groove of a pit (e.g., length and width of pit groove). As a parameter of a judging subject, density may be employed. In this case, relationships between depths of grooves and dark/light of images are obtained from experiment values, and then, a width of the density may be set as a threshold value.

The control computer 40 is arranged so as to carry out the above-described judging process operation. For example, in the case that the parameter for the judging subject is a width of a groove, the control computer 40 acquires a groove width on an optical disk by performing an image processing operation with respect to an image of the optical disk. The control computer 40 stores thereinto a range of a normal groove width as the threshold value. Then, the control computer 40 compares the groove width obtained from the image with the threshold value to judge as to whether or not an abnormal condition is present.

Also, the control computer 40 may function as a comparing unit which compares design data with an image and judge as to whether or not an abnormal condition is present by this comparing operation. In this case, the control computer 40 stores thereinto information which corresponds to the design data. The stored information is compared with an image of an optical disk which should be examined, so that the control computer 40 may judge as to whether or not an abnormal condition is present based upon a difference between the stored information and the image of this optical disk.

Also, the control computer 40 may function as a comparing unit which compares an image with another image and judge as to whether or not an abnormal condition is present by this image comparing operation. In this case, the control computer 40 stores thereinto, for example, an image of a normal optical disk. Then, the stored image is compared with an image of an optical disk which should be examined, so that the control computer 40 may judge as to whether or not an abnormal condition is present based upon a difference component between the stored image and the image of this optical disk. In such a case that the difference image component is larger than, or equal to a predetermined level, the control computer 40 judges that the abnormal condition is present.

The processes including comparing and calculating in the above-described judging process operation may be carried out by a comparision-purpose circuit, and also may be carried out by constructing a calculating device with employment of a processor, if required. As previously explained, the above-described comparing operation may be carried out by executing a comparing operation of software in the control computer 40.

The respective structures of the examining apparatus 10 according to this embodiment are described in the above explanations. Operations of this examining apparatus 10 will now be described. Positioning of an optical disk is carried out by the stage 18. While the optical disk is rotated, an electron beam is emitted from the electron gun 12. The electron beam is bent by the Wien filter 16 and an intended or desirable position of the optical disk is irradiated with the electron beam. When the electron beam is emitted and the disk is irradiated with the electron beam, electrons such as reflection electrons are emitted from the optical disk. These emitted electrons own information of a surface of the optical disk. These electrons pass through the Wien filter 16 and the secondary lens system 20, and are detected by the detector 22. Then, an electric signal is outputted from the detector 22 to the image producing device 24, and then, this image producing device 24 produces an image of this surface of the optical disk. The produced image is displayed on the display. Since the image of the surface of the optical disk is displayed, shapes of pits, and the like formed on the optical disk can be viewed. Also, the image of the surface of the optical disk is supplied to the control computer 40. The control computer 40 processes the image information to mechanically judge as to whether or not an abnormal condition is present based upon the image information in accordance with the above-described manner. A judgement result is outputted from a monitor, or the like in combination with the image of the surface of the optical disk.

The preferred embodiment of the present invention is explained. In accordance with this embodiment, the examining apparatus irradiates the information recording medium with the electron beam, detects the electrons which have acquired the information of the surface of the information recording medium, and acquires the image of the surface of the information recording medium. Therefore, it is possible to examine the surface structure of the information recording medium. Also, since the electron beam is employed, the very fine shape can be examined, and also, the examining apparatus can examine the information recording medium having the recording-purpose structural objects which are made in very fine shapes in order to achieve the high storage capacity can be examined.

Also, as previously explained, the examining apparatus of this embodiment may be furthermore equipped with the comparing unit for comparing the images with each other. Since the images are compared with each other, a defect can be mechanically detected.

Also, as previously explained, the examining apparatus of this embodiment may be furthermore equipped with the judging calculating unit for judging as to whether or not the abnormal condition is present based on or according to whether or not the value related to the shape of the pit is present within the predetermined range. Therefore, the judging calculating unit can mechanically judge as to whether or not the abnormal condition is present.

As previously explained, in this embodiment, the detector may own a plurality of pixel arrays on the detecting surface, and the image of the surface of the information recording medium may be projected onto this detecting surface. Therefore, the information of the projection image of the information recording medium can be suitably obtained. Furthermore, the observation time and the examination time can be shortened by carrying out the image projection. This feature is utilized and the examining apparatus and steps may then be assembled in a production line, thereby productivity can be improved.

Also, in this embodiment, as previously explained, the detector may have the two-dimension pixel array on the detecting surface. This detector may own a function capable of integrating signals of images projected on the detecting surface while the stage moves. The signals of the images may be integrated in the line unit of this two-dimensional pixel array, that is, signals of lines of the two-dimensional pixel array may be integrated as units of integrating (line signals are integrated). Typically, this detector may be the above-explained TDI sensor. Since such a detector is provided, the suitable examination data having the large S/N ratio can be acquired, so that the examination precision can be improved.

Second Embodiment

Figure 8:
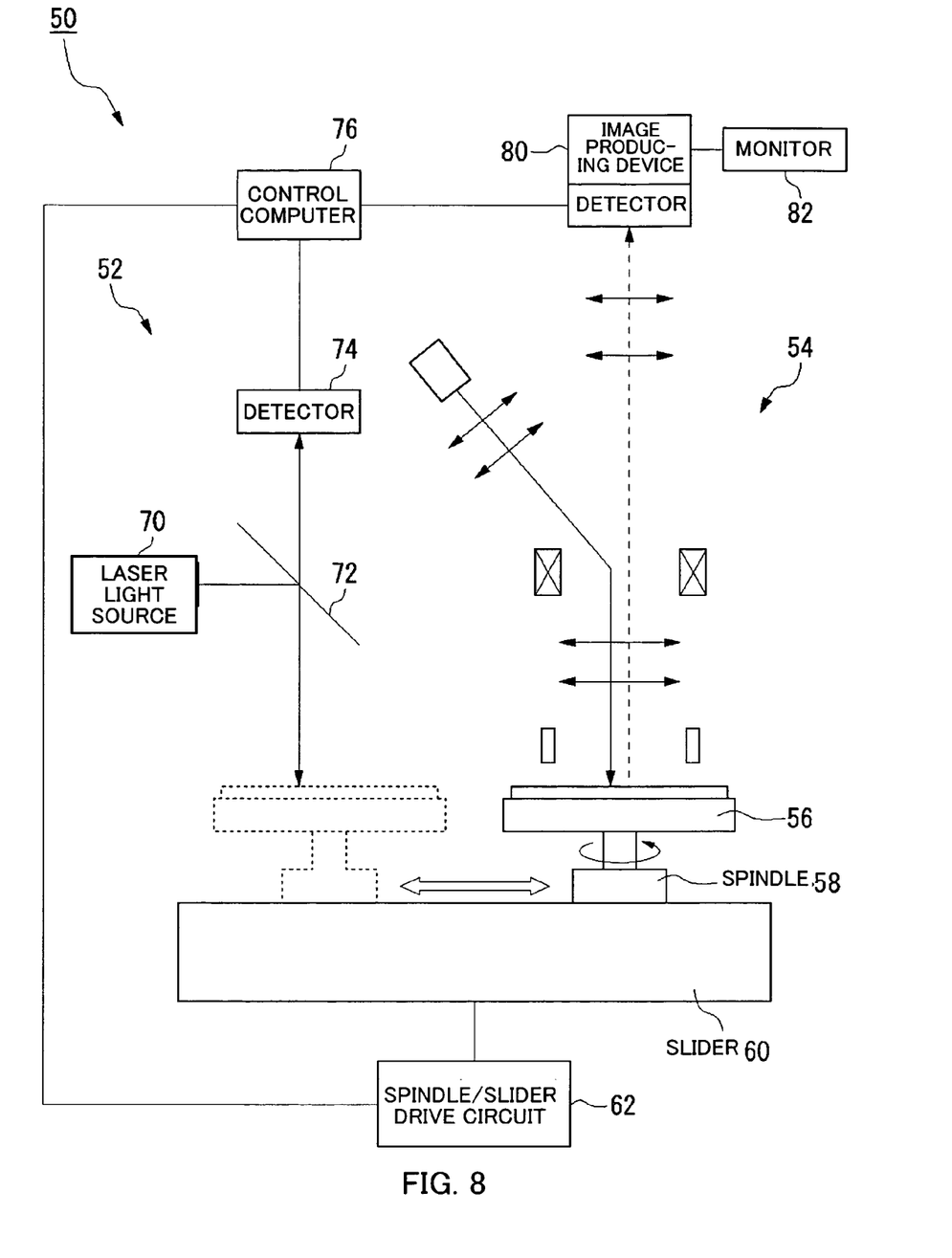
FIG. 8 is a diagram for illustratively representing an internal arrangement of an examining apparatus according to the second embodiment of the present invention.

Next, a description is made of the second embodiment of the present invention. FIG. 8 schematically shows an examining apparatus 50 of this embodiment. The examining apparatus 50 is equipped with a defect detecting unit 52 and a defect observing (viewing) unit 54 as an entire arrangement. The defect detecting unit 52 is constituted so as to detect a defect on an optical disk by employing light. In this embodiment, laser light is employed by the defect detecting unit 52. The defect observing unit 54 is constituted so as to observe and view a defect by using a defect observing-purpose electron beam. The defect observing unit 54 is equipped with the above-described arrangement of the examining apparatus according to the first embodiment. The defect observing unit 54 is constituted so as to observe the defect detected by the defect detecting unit 52. Subsequently, the respective arrangements shown in FIG. 8 will now be explained.

In FIG. 8, a stage 56 for holding an optical disk is supported on a spindle 58, and the spindle 58 is supported on a slider 60. As previously explained in the first embodiment, the spindle 58 rotates the stage 56. Also, the stage 56 is arranged so as to be able to be moved along the radial direction with an optical disk. The slider 60 is equipped with a mechanism which slides the stage 56 and moves this stage 56 between the defect detecting unit 52 and the defect observing unit 54. The spindle 58 and the slider 60 are driven by a spindle/slider drive circuit 62.

Next, the structure of the defect detecting unit 52 will now be explained. The defect detecting unit 52 is equipped with a laser light source 70, a half mirror 72, a detector 74, and a control computer 76. The laser light source 70 irradiates an optical disk which should be examined with laser light. The half mirror 72 changes a direction of the laser light. The detector 74 is constituted by a light receiving device and detects light reflected from the optical disk. A detection result from the detector 74 is supplied to the control computer 76. The control computer 76 functions as a calculating unit for specifying a defect position based upon the information detected by the detector 74. Also, the control computer 76 functions as a memory which stores thereinto data of the specified defect position. Furthermore, the control computer 76 functions as an output unit which transmits the data of the defect position to the defect observing unit 54.

The laser light source 70 emits a laser light beam along a direction substantially parallel to the optical disk. The half mirror 72 is arranged so as to receive the laser light emitted from the laser light source 70, and change the direction of the laser light at an angle of approximately 90 degrees so as to enter the laser light into the optical disk in the vertical direction. The detector 74 is positioned just above the optical disk, and this detector 74 is arranged so as to receive and detect a laser light which is reflected from the optical disk and passes through the half mirror 72.

A structure of transmitting/receiving laser light is not limited only to the above-explained structure within the technical scope of the present invention. Other structures may be employed as far as the detector can receive the laser light. For example, a laser light transmitting/receiving structure may be provided in which laser light is entered to an optical disk along an oblique direction, and then, the laser light is reflected from this optical disk along an oblique direction. For example, the laser light source may be provided just above the optical disk and the position of the detector may be shifted along a lateral direction, and reflection light may be conducted to the detector by employing a mirror.

The irradiating operation of the laser light is carried out while the optical disk is being rotated. A rotation speed and a position of the optical disk are adjusted by the control computer 76. The control computer 76 sends a control signal to the spindle/slider drive circuit 62 to control the slider 60 and the spindle 58, thereby controls a position and a rotation of the stages 56 and the optical disk. The above-explained rotation and disk position control operations are conducted, irradiation of laser light is carried out in either a circular shape or a spiral shape in accordance with a data recording sequence on the optical disk, so that information is read out.

Also, the detector 74 is arranged by a light receiving element. As this light receiving element, various sorts of light receiving elements capable of measuring intensity of light may be applied. For example, it is preferable to employ a light receiving element into which a photodetector is assembled.

As previously explained, the control computer 6 owns a function capable of acquiring a defect position from information of reflection light detected from the detector 74. The control computer 76 has previously stored thereinto a signal pattern corresponding to design data. This stored signal pattern is compared with the signal detected by the detector 74, so that an error (defect) is detected. In this case, when a difference between the design data and the detected value is larger than, or equal to a predetermined level, the control computer 76 judges that an error occurs. When the error is found out, a position of an error pit is acquired to be stored thereinto.

As explained above, the control computer 76 compares the information contained in the reflection light with the design data in order to judge as to whether or not the defect of the pit is present, and acquires the position of the defect pit, and then, stores the defect position data into a memory. It should be understood that in order to execute the above-described comparing calculation, a comparing calculation circuit may be separately provided.

Further, the control computer 76 is arranged so as to employ the defect positional data (error pit positional information) and send the instruction to the spindle/slider drive circuit 62, thereby controls the slider 60 and the spindle 58 and makes the stage 56 move. The control computer 76 moves the stage 56 with the optical disk such that the error pit is irradiated with the electron beam by the defect observing unit 54. Here, the control computer 76 functions as the alignment controlling device for positioning the optical disk based upon the defect positional data, and thus, may function as a portion of the defect observing unit. As a modification, a deflecting device may be provided in the electron beam optical system on the side of the defect observing unit, and the electron beam may be deflected such that the defect position is irradiated.

As previously explained, in this embodiment, the stage 56 is provided which can move between both the laser light source and the electron beam source in order that the optical disk which should be examined can be irradiated with the laser light and the electron beam. As represented in this drawing, the movement of the stage 56 between the irradiating positions is carried out by employing the slider 60. As explained above, the commonly used stage 56 is employed for two sorts of irradiating. Therefore, when the defect observing unit 54 irradiates with the electron beam the position of the defect detected by the defect examining unit 52, such a work for positioning the optical disk on the separately provided stages is no longer required. Therefore, the electron beam can be quickly and correctly emitted onto the defect position.

Next, a description is made of the defect observing unit 54. The defect observing unit 54 produces an image which is used to observe a defect shape by employing an electron beam. The defect observing unit 54 is arranged so as to irradiate the sample (disk) with an electron beam and detect generated electrons with a detector. The defect observing unit 54 comprises the arrangement of the examining apparatus explained in the first embodiment.

The defect observing unit 54 of this embodiment is arranged so as to irradiate the defect portion specified by the defect detecting unit 52 with the electron beam. The electron beam source is suitably arranged so as to emit an electron beam having a predetermined area. Also, either a CCD or a TDI-CCD may be suitably employed in the detector.

In this embodiment, more specifically, the defect portion has already been specified by the defect detecting unit 52. Therefore, as to the defect observing unit 54, it is preferable to determine the structure and the specification so as to achieve a major purpose which is to obtain images having high resolution rather than a wide viewing field. In view of this technical point, an image projection type observing apparatus is provided, and a high magnification mode is suitably used. A scanning electron microscope (SEM) may be employed as the model of the microscope itself. The image producing device 80 produces a disk surface image indicative of surface shape information of an optical disk from a signal supplied from the detector. A monitor 82 displays thereon the image produced by the image producing device 80. The defect observing unit 54 may be furthermore provided with such an abnormal judging calculation unit as explained in the first embodiment. The function of the abnormal judging calculation unit may be assembled in the control computer 76 of FIG. 8. In this case, the control computer 76 may also function as the defect observing unit 54.

The respective structures of the examining apparatus 50 according to this embodiment are described in the above explanations. Operations of this examining apparatus 50 will now be described. The slider 60 and the spindle 58 are driven by the spindle/slider drive circuit 62 under control of the control computer 76. Thereby, the stage 56 is positioned to the defect detecting unit 52, and an optical disk is rotated. Under this condition, the optical disk is irradiated with laser light from the laser light source 70, and reflection light is detected by the detector 74. Then, the control computer 76 detects a defect based upon the information detected by the detector 74 and specifies a position of this defect. The data as to the defect position is stored in the control computer 76 and supplied to the defect observing unit 54.

The control computer 76 further controls the slider 60 and the spindle 58 based upon the defect positional data. The optical disk is moved to the defect observing unit 54 with the stage 56 such that the defect of the optical disk is located at the irradiating position of the electron beam. Then, the defect position is irradiated with the electron beam, an image of the defect position is produced and displayed on the monitor 82. The surface shape of the optical disk can be observed by viewing the image displayed on the monitor 82.

As previously explained, in accordance with this embodiment, the defect is found out by the defect detecting unit 52 by employing the light, and the image of the defect portion is obtained by the defect observing unit 54 by employing the electron beam. Therefore, the shape analysis of the defect can be quickly carried out in high resolution. It is preferable to found out the defect by employing the light, so that the defect can be quickly found out. On the other hand, it is preferable to observe the very small shape by employing the electron beam. The apparatus suitable for finding out the defect is combined with the apparatus suitable for observing the shape of the defect, and these apparatus are separately operated, so that two roles such as the defect discovery and the defect observation can be achieved in higher levels. Then, the defect portion can be quickly found out, and the found defect portion can be observed in high resolution. Therefore, the defect portion can be observed in the high resolution.

Also, in accordance with this embodiment, the stage is commonly used with respect to the defect detecting apparatus using the light and the defect observing apparatus using the electron beam. Under a condition that the optical disk is mounted on the same stage, the examining apparatus is controlled such that the optical disk is irradiated with the electron beam based upon the detected defect positional data. The replacing operation of the optical disks and the positioning operation executed in the replacing operation are no longer required, so that the preparation time required for observing the defect can be shortened. Therefore, the examining apparatus according to this embodiment may be introduced in an in-line manner to a production line for optical disks.

Third Embodiment

Next, the third embodiment of the present invention will now be explained with employment of FIG. 9. This embodiment provides an apparatus 90 for continuously performing a recording operation and an examining operation with respect to an information recording medium. The examining apparatus 90 belongs to a so-called "read-after-write" type examining apparatus, and is arranged so as to perform an examining operation after recording information.

Figure 9:
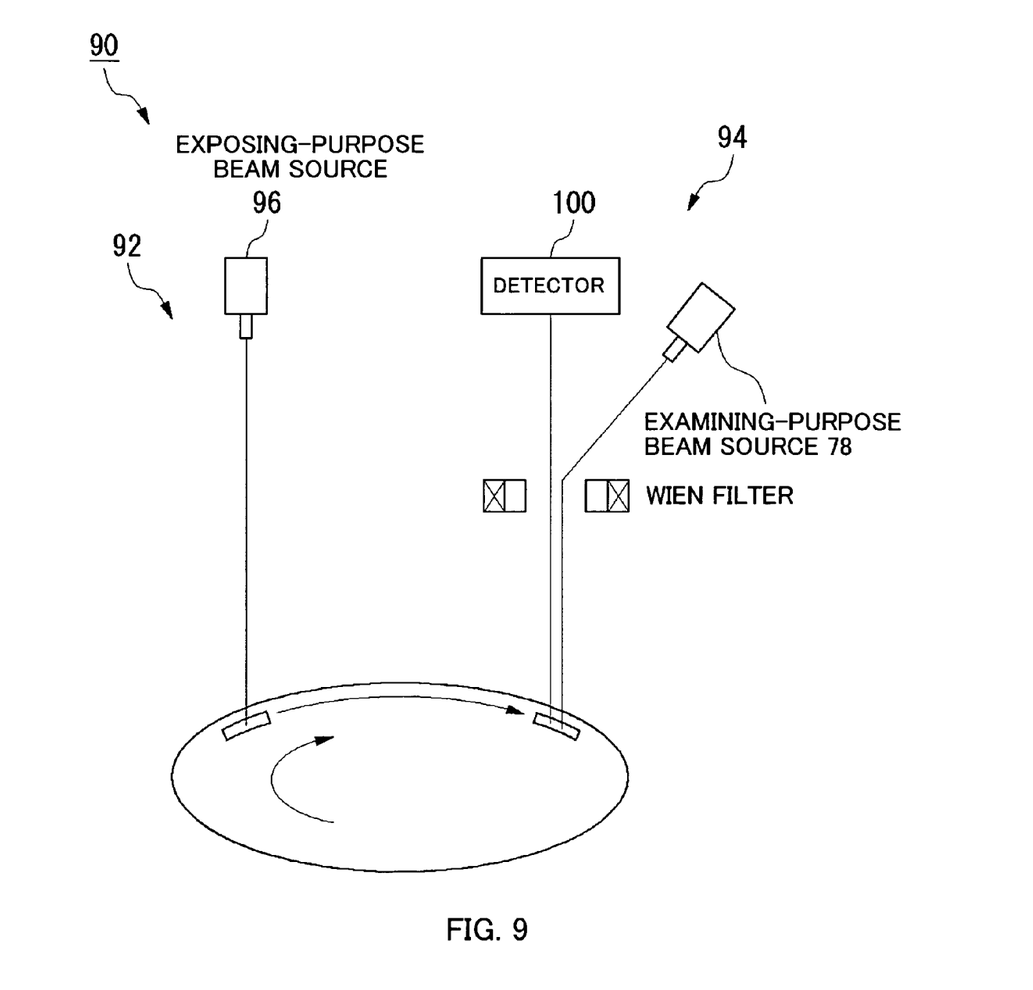
FIG. 9 is a diagram for illustratively representing an internal arrangement of a recording and examining apparatus according to the third embodiment of the present invention.

In FIG. 9, the examining apparatus 90 according to this embodiment is arranged by a recording unit 92 and an examining unit 94 as an entire structure. The recording unit 92 is illustrated on a left side, whereas the examining unit 94 is represented on a right side in this drawing. The information recording medium is a circular plate shape, and is mounted on a stage to be rotated. The recording unit 92 is provided so as to record information on the information recording medium on the upper stream side along a rotation direction of the stage. The examining unit 94 is provided so as to examine the information recording medium on the downstream side along the rotation direction of the stage.

The recording unit 92 is equipped with an electron beam source 96 for exposing an electron beam. The electron beam source 96 corresponds to a first electron gun, and is constituted so as to irradiate the medium with an electron beam in order to draw a pattern. Information is recorded on an information recording medium by irradiating it with the electron beam.

The examining unit 94 has the arrangement of the examining apparatus indicated in the above-explained embodiment. As indicated in this drawing, the examining unit 94 is provided with an electron beam source 98 for an examination purpose, a detector 100 for detecting electrons which are emitted from the information recording medium, and further the arrangement explained in the above-described embodiment. Further, a control computer is provided in a similar manner to the above-explained embodiment. The control computer functions as a defect calculating operation unit. Therefore, information recorded on the information recording medium is read out from the electrons detected by the detector 100. The control computer judges as to whether or not an abnormal condition is present in the information recording medium. As previously explained, the information recorded on the information recording medium is acquired in the form of an image.

The examination-purpose electron beam source 98 corresponds to the second electron gun. In this embodiment, as an examination-purpose electron beam, it is preferable to use an area beam which owns a wide irradiating area and covers or corresponds to a plurality of pixels within the irradiating area. It is preferable that the detector 100 can perform simultaneous imaging operations of the plurality of pixels. For example, either a CCD or the above-explained TDI-CCD is suitably employed in the detector 100.

An irradiating position of the examination-purpose electron beam is set on the upper stream side along the rotation direction with respect to the irradiating position of the recording-purpose electron beam. In this embodiment, the irradiating position of the exposure-purpose electron beam and the irradiating position of the examination-purpose electron beam are provided at the same distance from the rotation center or the outer periphery of the information recording medium. That is, the irradiating positions of the electron beams are such points which are separated from each other on the same circular arc. However, the irradiating positions of the electron beams may be positionally shifted along the radial direction. Thereby, a large time lag may be formed for a time duration from the recording (drawing) operation up to the examining operation. For example, the irradiating position of the examination-purpose electron beam may be set to the slightly inner side from the exposure-purpose electron beam along the radial direction so that the medium is irradiated with the examination-purpose electron beam after one to several times of rotations from the recording operation.

Next, a description is made of operations of the recording and examining apparatus 90 according to this embodiment of the present invention. The information recording medium is mounted on the stage and is rotated with this stage. Under this condition, an exposure-purpose electron beam is emitted from the electron beam source 96 and the medium is irradiated, so that a pattern groove is formed in a surface of the information recording medium. An examining-purpose electron beam is emitted onto the information recording medium where the pattern is formed, at downstream position just from the exposing position along the rotation direction. Then, electrons emitted from the information recording medium are detected by the detector 100. The examining unit 94 examines as to whether or not a defect is present in the pattern by employing the detection signal.

When a pattern is formed on the information recording medium, a developing stage is usually conducted after the pattern is formed, and thereafter, the pattern is examined. However, it is known in this technical field that as to a certain substrate such as a silicon substrate, a pattern may be formed without a developing step. The read-after-write type examining apparatus according to this embodiment is suitably applied to such a substrate. Then, it is possible to examine as to whether or not a signal defect is present or not just after the drawing operation, thereby the manufacturing steps can be very effectively executed.

As previously described in accordance with this embodiment, the information is recorded on the information recording medium mounted on the stage by employing the recording-purpose first electron beam source, and the information recording medium is examined by employing the examining-purpose second electron beam source. The examining apparatus can examine as to whether or not the defect is present just after recording, therefore, the productivity can be improved.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

What is claimed is:

1. An information recording medium examining apparatus for examining an appearance of an information recording medium, comprising:
    an electron gun for irradiating an intended position of said information recording medium with an electron beam;
    a stage for holding said information recording medium such that said information recording medium can be moved along a rotation direction and a radial direction;
    a detector for detecting electrons having acquired information of a surface of said information recording medium by irradiating said information recording medium with the electron beam;
    an image producing unit for acquiring an image of the surface of said information recording medium based on the electrons detected by said detector; and
    a recording-purpose electron gun for irradiating said information recording medium with an electron beam in order to record thereon information, wherein
    an irradiation position of said examining-purpose electron beam is provided at a post position of the irradiation position of the recording-purpose electron beam by said recording-purpose electron gun.

2. An information recording medium examining apparatus according to claim 1, further comprising:
    a comparing unit for comparing images with each other.

3. An information recording medium examining apparatus according to claim 1, further comprising:
    a judging calculation unit for judging as to whether or not an abnormal condition is present by checking as to whether or not a value related to a shape of a pit formed on said information recording medium is present in a predetermined range.

4. An information recording medium examining apparatus according to claim 1, wherein:
said detector owns an array of a plurality of pixels on a detecting surface, and said image of the surface of said information recording medium is projected onto said detecting surface.

5. An information recording medium examining apparatus according to claim 4, wherein:
said detector has a two-dimensional pixel array on the detecting surface; and
said detector owns a function capable of integrating signals of the images of the surfaces of said information recording medium, which are projected on said detecting surface while said stage moves, wherein signals of lines of said two-dimensional pixel array are integrated as units of integrating.

6. An information recording medium examining apparatus according to claim 1, wherein:
said electron gun emits the electron beam having an area capable of irradiating a region which contains a region on a sample corresponding to the imaging region of said detector.

7. An information recording medium examining apparatus according to claim 1, further comprising:
a defect detecting unit for acquiring a defect of a pit on said information recording medium from reflection light produced when light is emitted onto said information recording medium so as to produce defect positional data which indicates the position of said defect; and wherein,
said electronic gun irradiates the defect position indicated by said defect positional data produced by said defect detecting unit with the electron beam.

8. An information recording medium examining apparatus for examining an information recording medium, comprising:
an information recording medium defect detecting unit including: a light source for irradiating said information recording medium with light; a stage for rotating said information recording medium; a light receiving device for receiving reflection light from said information recording medium; and a calculating apparatus for judging whether or not a defect of a pit on said information recording medium is present by comparing information of the received reflection light with design data, and for producing defect positional data of said pit; and
an information recording medium defect observing unit including: an electron gun for irradiating a region which contains the defect position indicated by said defect positional data with an electron beam; a detector for detecting electrons generated from the region of the information recording medium which is irradiated with the electron beam; and an image producing unit for producing an image of a surface of said information recording medium based on the electrons detected by said detector.

9. An information recording medium recording and examining apparatus for irradiating a surface of an information recording medium with an electron beam so as to record thereon information and for examining an abnormal condition of the recorded information, comprising:
a first electron gun for irradiating said information recording medium with an electron beam so as to record thereon information;
a stage for mounting thereon said information recording medium such that said information recording medium can be moved along a rotation direction and a radial direction;
a second electron gun for irradiating said information recording medium with an electron beam in order to read the information recorded on said information recording medium;
a detector for detecting electrons emitted from said information recording medium; and
a defect calculating operation unit for reading the information recorded on said information recording medium from the electrons detected by said detector and judging as to whether or not an abnormal condition of said information recording medium is present.

10. An information recording medium examining method for examining an appearance of an information recording medium, comprising:
irradiating an intended position of said information recording medium with an electron beam;
detecting electrons having acquired information of a surface of said information recording medium by irradiating said information recording medium with the electron beam;
acquiring an image of the surface of said information recording medium from said detected electrons;
irradiating said information recording medium with the electron beam by a recording-purpose electron gun in order to record thereon information; and
providing an irradiation position of said examining-purpose electron beam at a post position of said irradiation position of the recording-purpose electron beam by said recording-purpose electron gun.

* * * * *